United States Patent [19]

Verstegen et al.

[11] 4,127,498
[45] Nov. 28, 1978

[54] LUMINESCENT MATERIAL

[75] Inventors: Judicus M. P. J. Verstegen; Willebrordus H. M. M. van de Spijker; Johannus G. Verlijsdonk, all of Eindhoven, Netherlands

[73] Assignee: U.S. Philips Corporation, New York, N.Y.

[21] Appl. No.: 472,283

[22] Filed: May 22, 1974

[30] Foreign Application Priority Data

Jun. 1, 1973 [NL] Netherlands ............................ 737628

[51] Int. Cl.$^2$ .............................................. C09K 11/46
[52] U.S. Cl. .................................. 252/301.4 F; 313/486
[58] Field of Search ................................ 252/301.4 F; 117/33.5 L; 313/486

[56] References Cited

U.S. PATENT DOCUMENTS

| | | | |
|---|---|---|---|
| 2,457,054 | 12/1948 | Leverenz | 252/301.4 F |
| 3,544,481 | 12/1970 | Barry | 252/301.4 F |
| 3,651,363 | 3/1972 | Barry | 252/301.4 F X |
| 3,813,569 | 5/1974 | Verstegen et al. | 252/301.4 F X |
| 3,839,219 | 10/1974 | Verstegen et al. | 252/301.4 F |

OTHER PUBLICATIONS

Ito et al., "Chemical Abstracts" vol. 67, 1967, p. 15826f.
Odelevskii et al., "Chemical Abstracts", vol. 54, p. 19249i.

Primary Examiner—Jack Cooper
Attorney, Agent, or Firm—Norman N. Spain

[57] ABSTRACT

A luminescent beryllium-containing silicate activated by bivalent europium defined by the formula $Me_{1-x}Eu_xBe_aSi_aO_{3a+1}$, in which $0.005 \leq x \leq 0.20$ and $a$ has the value 1 or 2 and in which Me represents at least one of the alkaline earth metals barium, strontium and calcium. If $a = 2$ at least 50 gram-atomic % of Me is strontium. If $a = 1$ up to 25 gram.atomic % of Be together with the same quantity of Si may be replaced by an equiatomic quantity of Al.

The luminescent silicate is preferably used in mercury vapor discharge lamps.

4 Claims, 1 Drawing Figure

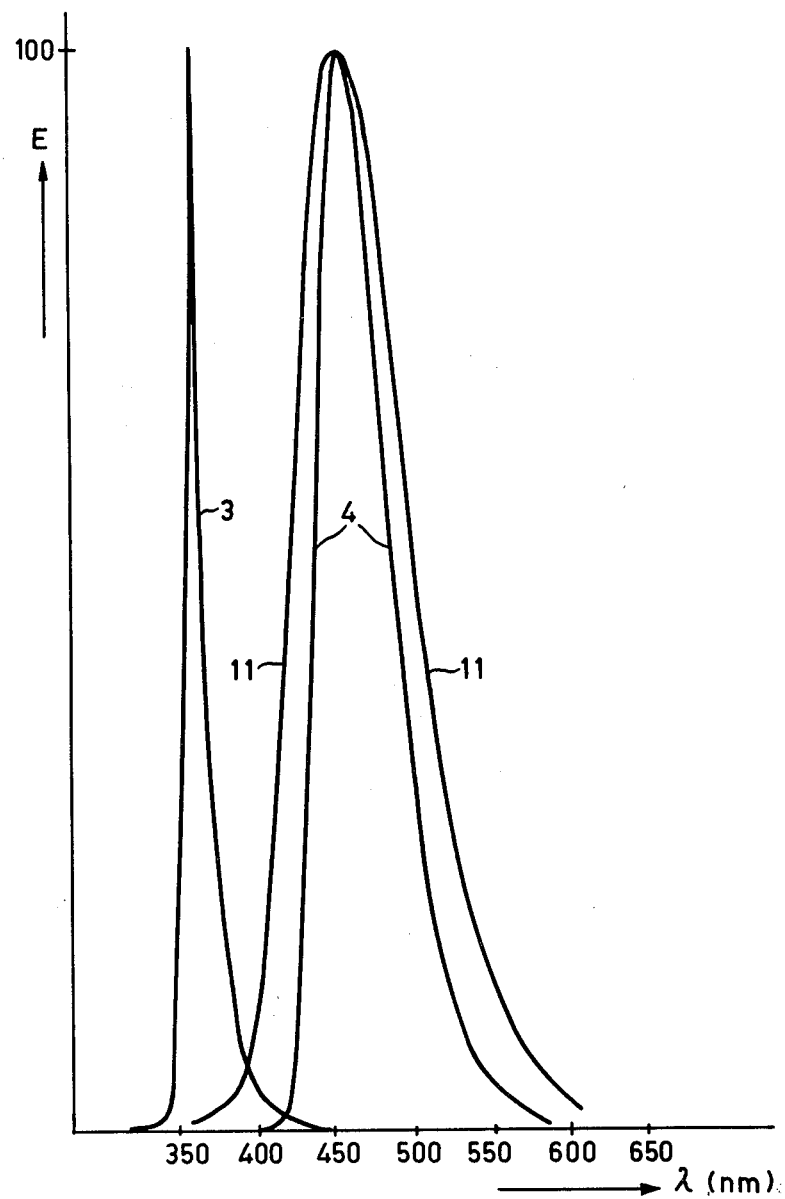

LUMINESCENT MATERIAL

The invention relates to a luminescent screen provided with a luminescent beryllium-containing silicate. Furthermore the invention relates to mercury vapour discharge lamps provided with such a luminescent screen and to the said luminescent silicate itself.

A luminescent beryllium-containing silicate is known from U.S. Pat. No. 2,176,100. This specification describes manganese-activated zinc beryllium silicate which may include a second activator in small quantities chosen from the group of rare earths. The elements samarium, neodymium and lanthanum are mentioned as second activators. Thallium-activated ortho and metasilicates of beryllium and/or magnesium and/or aluminum are known from German Patent Specification No. 715,213.

The use of the element europium in a bivalent form as an activator in luminescent materials is known and in many cases it gives rise to an efficient emission in a comparatively narrow band located in the near ultraviolet or in the blue part of the spectrum. The most important use of these materials is in discharge lamps. United Kingdom patent specification No. 1,222,859, for example, describes alkaline earth disilicates activated by bivalent europium. Alkaline earth magnesium silicates activated by bivalent europium are known from United Kingdom patent specifications Nos. 1,205,298 and 1,205,319.

It is an object of the invention to provide novel luminescent materials having an efficient narrow band emission in the long wave ultraviolet part of the spectrum or in the blue part of the spectrum.

According to the invention a luminescent screen is provided with a luminescent beryllium-containing silicate and is characterized in that the silicate is activated by bivalent europium and is defined by the formula $Me_{1-x}Eu_xBe_aSi_aO_{3a+1}$ in which $0.005 \leq x \leq 0.20$, $a$ has the value 1 or 2 and Me represents at least one of the alkaline earth metals barium, strontium and calcium, in which, if $a = 2$, at least 50 gram-atomic % of Me is strontium and in which, if $a = 1$, up to 25 gram-atomic % of beryllium together with the same quantity of silicon may be replaced by an equiatomic quantity of aluminium.

If $a = 2$ the fundamental lattice of the luminescent materials according to the invention is given by the formula $MeBe_2Si_2O_7$ and if $a = 1$ or by the formula $MeBeSiO_4$.

X-ray diagrams show that the compound $SrBe_2Si_2O_7$ has an orthorhombic crystal symmetry, isomorphic with the mineral barylite. This compound may constitute mixed crystals with the analogous isomorphic barium compound. Upon activation by bivalent europium $SrBe_2Si_2O_7$ constitutes a very efficient luminescent material. Replacement of strontium in this luminescent material by barium and also by calcium is possible. In the luminescent materials according to the invention with a fundamental lattice defined by the formula $MeBe_2Si_2O_7$, Me always consists, however, for at least 50 gram-atomic % of strontium because otherwise materials having a too low luminous flux are obtained. The fundamental lattices $BaBe_2Si_2O_7$ and $CaBe_2Si_2O_7$ yield materials upon activation by bivalent europium which are not usable in practice.

The fundamental lattices defined by the formula $MeBeSiO_4$ in which Me is barium, strontium or calcium are novel crystalline compounds having mutually different crystal structures. It has been found that these compounds, through not isomorphic, show a certain mutual solubility. When, in the manufacture of a luminescent silicate with the fundamental lattice defined by the formula $MeBeSiO_4$ in which two or more of the said alkaline earth metals have been chosen for Me, a demixing of crystal phases occurs, it is generally not clearly noticeable in the luminescence properties of the obtained luminescent material because the luminescence properties of the separate crystal phases have a strong resemblance to one another. Also when, for Me, two or more of the alkaline earth metals are chosen, very efficient luminescent materials are obtained.

It has been found that in the lattices defined by the formula $MeBeSiO_4$ beryllium together with the same quantity of silicon may be replaced by an equiatomic quantity of aluminum, that is to say, $p$ atoms Be together with $p$ atoms Si may be replaced by $2p$ atoms Al. In the luminescent materials according to the invention not more than 25 gram-atomic % of beryllium in these lattices is replaced in this manner while the emission properties of the material substantially do not change. In fact, when the said upper limit of 25 gram-atomic % is exceeded in this replacement, materials having a too low luminous flux and an emission band shifted in the spectrum are obtained.

Activation of the said fundamental lattices by bivalent europium replacing part of the alkaline earth metal denoted by Me produces luminescent materials which can be satisfactorily excited by, for example, X-rays and electrons and particularly by both short-wave and long-wave ultraviolet radiation. The radiation emitted by these materials has a spectral distribution which for the materials with $a = 2$ consists of a very narrow band at a maximum of approximately 360 nm and for the materials with $a = 1$ consists of a band having a maximum located in the range of between approximately 450 and 470 nm.

The europium concentration $x$ in the luminescent silicate according to the invention may be chosen to be between the values 0.005 and 0.20. For values of $x$ of less than 0.005 materials having a too low luminous flux are obtained and for values of $x$ of more than 0.20 materials are obtained whose quantum efficiency is too low. The highest luminous fluxes are obtained with luminescent silicates according to the invention in which $x$ has a value of between 0.02 and 0.10. Consequently such materials are preferred.

A very advantageous group of luminescent silicates according to the invention consists of the materials defined by the above given general formula in which $a = 2$ and Me is strontium. These materials have an emission in a very narrow band (half value width approximately 11 nm) with a maximum at approximately 360 nm and are very suitable for use in discharge lamps intended for influencing photochemical reactions, for example for lacquer hardening and document reproduction. A lamp which frequently used in such photochemical processes contains luminescent lead-activated barium disilicate. Compared with this known material the above described silicate according to the invention has the advantage that the emitted radiation energy is concentrated in a narrower band whose peak height is approximately twice as large as that of the known silicate. Consequently a larger concentration of the radiation energy at the wavelengths which are optimum for the photochemical process are obtained with the silicate according to the invention.

The luminescent silicates according to the invention in which $a = 2$ and Me is strontium are preferably used in mercury vapour discharge lamps. Since these silicates are eminently excited by short-wave ultraviolet radiation, these lamps are preferably formed as low-pressure mercury vapour discharge lamps (predominantly 254 nm. excitation). Furthermore it has been found that these materials can likewise be used satisfactorily in high-pressure mercury vapour discharge lamps in which they convert the 254 nm and 313 nm radiation into long-wave ultraviolet radiation.

It is a special advantage that these silicates have a very favourable temperature dependence of the luminous flux. At a temperature of 500° C. the luminous flux of these materials is still approximately 100% of the luminous flux at room temperature.

Another preferred group of luminescent silicates according to the invention consists of the materials defined by the above given general formula in which $a = 1$ and Me consists for at least 50 gram-atomic % of strontium. The luminescent europium-activated $SrBeSiO_4$ has an efficient emission in a comparatively narrow band (half value width approximately 48 nm) with a maximum at approximately 457 nm. Consequently this material is very suitable for use together with other luminescent materials in low-pressure mercury vapour discharge lamps for general illumination purposes. In such lamps the said $SrBeSiO_4$ may eminently serve as the component supplying the blue radiation of the mixture of luminescent materials employed. A colour correction of the radiation emitted by these lamps may also be obtained with this silicate. When replacing strontium in the said $SrBeSiO_4$ by barium and/or calcium, the luminescence properties of the material vary only slightly. In case of an increasing barium and/or calcium content a broadening of the emission band is obtained. Replacement of strontium by calcium also results in a slight shift of the maximum of the emission band to longer wavelengths. For the above-mentioned use in low-pressure mercury vapour discharge lamps such a broadening of the emission band is generally not desired. Consequently the silicates defined by the formula $MeBeSiO_4$ in which at least 50 gram-atomic % of the alkaline earth metal denoted by Me consists of strontium are preferred.

The luminescent silicates according to the invention are preferably manufactured by means of a solid state reaction at an elevated temperature. The starting mixture is a mixture of the composite oxides or of compounds yielding these oxides upon an increase in temperature. This mixture is heated for some time at a high temperature, for example, 900° to 1250° C. in a weakly reducing atmosphere. This heat treatment is preferably performed in several stages while after each heat treatment the reaction product is ground and sieved. It is often advantageous to subject the reaction mixture to a preheat treatment at a relatively low temperature, for example, at 700° C. in air.

As is generally known, it is often advantageous in the synthesis of luminescent materials to introduce the composite components into the reaction mixture in quantities which deviate from the stoichiometrically determined quantities. An excess of one or more of the composite constituents may enhance the formation reaction of the luminescent material and/or may have a favourable influence on the grain properties of the material obtained. It has been found that also for the luminescent silicates according to the invention there applies that deviations from stoechiometry in the manufacture of the silicates yield advantage. Notably an excess of silicon is preferably used. This excess may even amount to 100 gram-atomic %. It is assumed that the luminescent phase obtained satisfies the stoechiometrical formula. An excess still possibly present of one or more of the composite components substantially does not have any influence on the properties of the actual luminescent phase.

The invention will now be described in greater detail with reference to an example, a number of measurements and a drawing. In the drawing the sole FIGURE shows in a graph the spectral distribution of the emitted radiation of a number of luminescent silicates according to the invention.

EXAMPLE

A mixture is made of 28.34 g $SrCO_3$
5.00 g BeO
12.02 g $SiO_2$
1.41 g $Eu_2O_3$.

This mixture is heated in air in a furnace for 1 hour at 700° C. After cooling the product is pulverized and subsequently heated for 1 hour at 1100° C. in a weakly reducing atmosphere. This atmosphere may be obtained, for example, by passing a mixture of nitrogen and some % by volume of hydrogen into the furnace. After the heat treatment the reaction product is ground and sieved. The material obtained in this manner consists of a luminescent silicate activated by bivalent europium and defined by the formula $Sr_{0.96}Eu_{0.04}BeSiO_4$. The emission spectrum of this material upon excitation by short-wave ultraviolet radiation (predominantly 254 nm). is shown in the drawing (Curve 4). The emission maximum is located at approximately 457 nm and the half value width of the emission band is approximately 48 nm. The luminous flux of this material (upon excitation by short-wave ultraviolet radiation) is 158% relative to a standard. As a standard is used a luminescent calcium halophosphate activated by antimony and manganese which is mixed with non-luminescent calcium carbonate in such quantities that the luminous flux of halophosphate has been reduced by approximately 50% of the original value.

The method of the above-mentioned example was repeated with the difference that 5 mol % of $SiO_2$ in an excess above the stoechiometrically required quantity was used in the mixture. In addition the heat treatment was performed twice, each time for 1 hour, in a weakly reducing atmosphere at 1100° C. The luminous flux of the material thus obtained is 176% relative to the said standard. The use of an excess of 10 mol % of $SiO_2$ yields a material having a luminous flux of 192%. An excess of 100 mol % $SiO_2$ yields a material having a luminous flux of 189%.

By similar methods, a number of examples of luminescent silicates according to the invention was manufactured. The following table I states the results of measurements on these silicates. Each example states in addition to the formula of the relevant silicate the value of the luminous flux (LO) in % relative to the above-mentioned standard upon excitation by short-wave ultraviolet radiation (254 nm). The table states under A the value of the absorption of the exciting ultraviolet radiation in % relative to the absorption of ZnO. Furthermore the location of the maximum emission in the spectrum ($\gamma$ max) and the half value width of the emission band (hwb) is stated in nm.

TABLE I

| Ex. | Formula | LO (%) | A (%) | $\lambda$max (nm) | hwb (nm) |
|---|---|---|---|---|---|
| 1 | $Sr_{0.99}Eu_{0.01}Be_2Si_2O_7$ | 132 | 93 | 360 | 11 |
| 2 | $Sr_{0.97}Eu_{0.03}Be_2Si_2O_7$ | 146 | 98 | 360 | 11 |
| 3 | $Sr_{0.95}Eu_{0.05}Be_2Si_2O_7$ | 172 | 97 | 360 | 11 |
| 4 | $Sr_{0.96}Eu_{0.04}BeSiO_4$ | 158 | 77 | 457 | 48 |
| 5 | $Sr_{0.96}Eu_{0.04}Be_{0.9}Al_{0.2}Si_{0.9}O_4$ | 104 | 76 | 457 | 52 |
| 6 | $Sr_{0.96}Eu_{0.04}Be_{0.75}Al_{0.50}Si_{0.75}O_4$ | 71 | 79 | 457 | 55 |
| 7 | $Sr_{0.86}Ba_{0.10}Eu_{0.04}BeSiO_4$ | 129 | 77 | 457 | 53 |
| 8 | $Sr_{0.71}Ba_{0.25}Eu_{0.04}BeSiO_4$ | 108 | 72 | 463 | 64 |
| 9 | $Sr_{0.56}Ba_{0.40}Eu_{0.04}BeSiO_4$ | 121 | 79 | 464 | 65 |
| 10 | $Sr_{0.26}Ba_{0.70}Eu_{0.04}BeSiO_4$ | 133 | 77 | 453 | 64 |
| 11 | $Ba_{0.96}Eu_{0.04}BeSiO_4$ | 142 | 79 | 455 | 77 |
| 12 | $Sr_{0.86}Ca_{0.10}Eu_{0.04}BeSiO_4$ | 146 | 81 | 457 | 51 |
| 13 | $Sr_{0.71}Ca_{0.25}Eu_{0.04}BeSiO_4$ | 134 | 83 | 458 | 53 |
| 14 | $Sr_{0.56}Ca_{0.40}Eu_{0.04}BeSiO_4$ | 138 | 83 | 459 | 58 |
| 15 | $Sr_{0.26}Ca_{0.70}Eu_{0.04}BeSiO_4$ | 149 | 82 | 467 | 80 |
| 16 | $Ca_{0.96}Eu_{0.04}BeSiO_4$ | 127 | 82 | 470 | 85 |

The influence of the europium content $x$ is apparent, for example, from the measurements of the luminous flux (LO) and absorption (A) on a number of silicates defined by the formula $Sr_{1-x}Eu_xBeSiO_4$ with different values for $x$. The measurements are summarized in table II.

TABLE II.

| Example | x | LO(%) | A(%) |
|---|---|---|---|
| 17 | 0.01 | 166 | 80 |
| 18 | 0.02 | 189 | 87 |

TABLE II.-continued

| Example | x | LO(%) | A(%) |
|---|---|---|---|
| 19 | 0.04 | 190 | 85 |
| 20 | 0.05 | 188 | 90 |
| 21 | 0.15 | 157 | 100 |

The drawing shows in a graph the spectral energy distribution of some luminescent silicates according to the invention upon excitation by short-wave ultraviolet radiation. Curve 3, 4 and 11 relate to the materials of examples 3, 4 and 11, respectively, of table I. The wavelength $\gamma$ is plotted in nm. on the horizontal axis and the radiation energy E per constant wavelength interval is plotted in arbitrary units on the vertical axis. The maximum radiation energy is fixed at 100 for each curve.

What is claimed is:

1. A luminescent beryllium-containing silicate, activated by bivalent europium and defined by the formula $Me_{1-x}Eu_xBe_aSi_aO_{3a+1}$, in which $0.005 \leq x \leq 0.20$ and $a$ has the value 1 or 2 and in which Me represents at least one alkaline earth metal selected from the group consisting of barium, strontium and calcium, in which, if $a = 2$, at least 50 gram. atomic % of Me is strontium and in which, if $a = 1$, up to 25 gram. atomic % of beryllium together with the same quantity of silicon may be replaced by an equiatomic quantity of aluminum.

2. The luminescent silicate of claim 1 wherein $0.02 \leq x \leq 0.10$.

3. The luminescent silicate of claim 1 wherein $a = 2$ and Me is strontium.

4. The luminescent silicate of claim 1 wheren $a = 1$ and at least 50 gram atomic % of Me is strontium.

* * * * *

UNITED STATES PATENT AND TRADEMARK OFFICE
CERTIFICATE OF CORRECTION

PATENT NO. : 4,127,498
DATED : November 28, 1978
INVENTOR(S) : JUDICUS M.P.K. VERSTEGEN ET AL It is certified that error appears in the above-identified patent and that said Letters Patent are hereby corrected as shown below:

In the Foreign Application Priority Data the priority number should be changed to --7307628--

Signed and Sealed this

Fifteenth Day of May 1979

[SEAL]

Attest:

RUTH C. MASON
Attesting Officer

DONALD W. BANNER
Commissioner of Patents and Trademarks